(12) United States Patent
Tsai et al.

(10) Patent No.: US 12,405,617 B2
(45) Date of Patent: Sep. 2, 2025

(54) MULTIDIRECTIONAL DOCKING APPARATUS AND METHODS FOR CHARGING A DEVICE

(71) Applicant: GEOSAT Aerospace & Technology Inc., Tainan (TW)

(72) Inventors: Chiu-Teng Tsai, Tainan (TW); Yi-Bin Lin, Tainan (TW); Chao-Wen Fu, Tainan (TW)

(73) Assignee: GEOSAT AEROSPACE & TECHNOLOGY INC., Tainan (TW)

( * ) Notice: Subject to any disclaimer, the term of this patent is extended or adjusted under 35 U.S.C. 154(b) by 33 days.

(21) Appl. No.: 18/345,403

(22) Filed: Jun. 30, 2023

(65) Prior Publication Data

US 2024/0002070 A1    Jan. 4, 2024

Related U.S. Application Data

(60) Provisional application No. 63/357,811, filed on Jul. 1, 2022.

(51) Int. Cl.
| | |
|---|---|
| *G05D 1/661* | (2024.01) |
| *B64U 70/90* | (2023.01) |
| *B64U 80/25* | (2023.01) |
| *G05D 1/243* | (2024.01) |
| *H02J 7/00* | (2006.01) |
| *H01R 13/66* | (2006.01) |

(52) U.S. Cl.
CPC ............. *G05D 1/661* (2024.01); *B64U 70/90* (2023.01); *B64U 80/25* (2023.01); *G05D 1/243* (2024.01); *H02J 7/0036* (2013.01); *H02J 7/0044* (2013.01); *H01R 13/6683* (2013.01)

(58) Field of Classification Search
CPC .... B64U 80/25; B64U 70/90; B64U 2101/30; B64F 1/35; H02J 7/0036
See application file for complete search history.

(56) References Cited

U.S. PATENT DOCUMENTS

| | | | | |
|---|---|---|---|---|
| 2021/0094686 A1* | 4/2021 | Metzner | ................. | G08B 19/00 |
| 2023/0137016 A1* | 5/2023 | Wiegman | ............... | G01R 31/66 |
| | | | | 320/107 |

* cited by examiner

*Primary Examiner* — Timothy D Collins
*Assistant Examiner* — Justin Michael Heston
(74) *Attorney, Agent, or Firm* — McClure, Qualey & Rodack, LLP

(57) ABSTRACT

Docking apparatus and methods for providing charging power to a power storage device of an external device, the docking apparatus including a docking portion for the external device to dock with; a plurality of power-supply contacts mounted on a surface of the docking portion and arranged in an L shape; and a control circuit configured to detect whether the external device docks with the docking portion and supply power to the power-supply contacts on the docking portion in response to detecting that the external device docks with the docking portion.

33 Claims, 13 Drawing Sheets

US 12,405,617 B2

MULTIDIRECTIONAL DOCKING APPARATUS AND METHODS FOR CHARGING A DEVICE

CROSS-REFERENCE TO RELATED APPLICATION

The present application claims priority to U.S. Provisional Application No. 63/357,811, filed on Jul. 1, 2022, the entire contents of which are incorporated herein by reference.

TECHNICAL FIELD

The present application relates to docking apparatus for charging a device, and more particularly, to multidirectional docking apparatus and methods for charging a device.

BACKGROUND

When a device needs to be charged, a user usually needs to align the device's charging connector with a charger's connector before electrically connecting the device to the charger. The alignment may require additional attention and time from the user. It may cause inconvenience and inefficiency to the user. If a device to be charged is an unmanned device, the unmanned device and/or a charger may require an additional mechanism for aligning their connectors. The additional mechanism may cause additional power consumption and/or cost increase and require additional operation time.

SUMMARY

Embodiments of the present application provide apparatus and methods for providing charging power to an external device.

These embodiments include docking apparatus for providing charging power to a power storage device of an external device. The docking apparatus includes a docking portion for the external device to dock with. The docking apparatus also includes a plurality of power-supply contacts mounted on a surface of the docking portion and arranged in an L shape. The docking apparatus also includes a control circuit configured to detect whether the external device docks with the docking portion and supply power to the power-supply contacts on the docking portion in response to detecting that the external device docks with the docking portion.

These embodiments also include an unmanned aerial vehicle (UAV) system. The UAV system includes a UAV including a power storage device and a plurality of charging contacts. The UAV system also includes a docking station including a docking portion for the UAV to dock with. The docking apparatus also includes a plurality of power-supply contacts mounted on a surface of the docking portion and arranged in an L shape. The docking apparatus also includes a control circuit configured to detect whether the external device docks with the docking portion and supply power to the power-supply contacts on the docking portion in response to detecting that the external device docks with the docking portion.

These embodiments further include a method for providing charging power to an unmanned aerial vehicle (UAV). The method includes controlling the UAV to fly above and align with a docking portion of docking apparatus, aligning a plurality of charging contacts of the UAV with a plurality of power-supply contacts on the docking portion, and decreasing a height of the UAV to dock with the docking portion, so that two or more of the charging contacts of the UAV are electrically coupled to two or more of the power-supply contacts of the docking portion.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatus and methods consistent with aspects related to the invention as recited in the appended claims.

Figure 1:
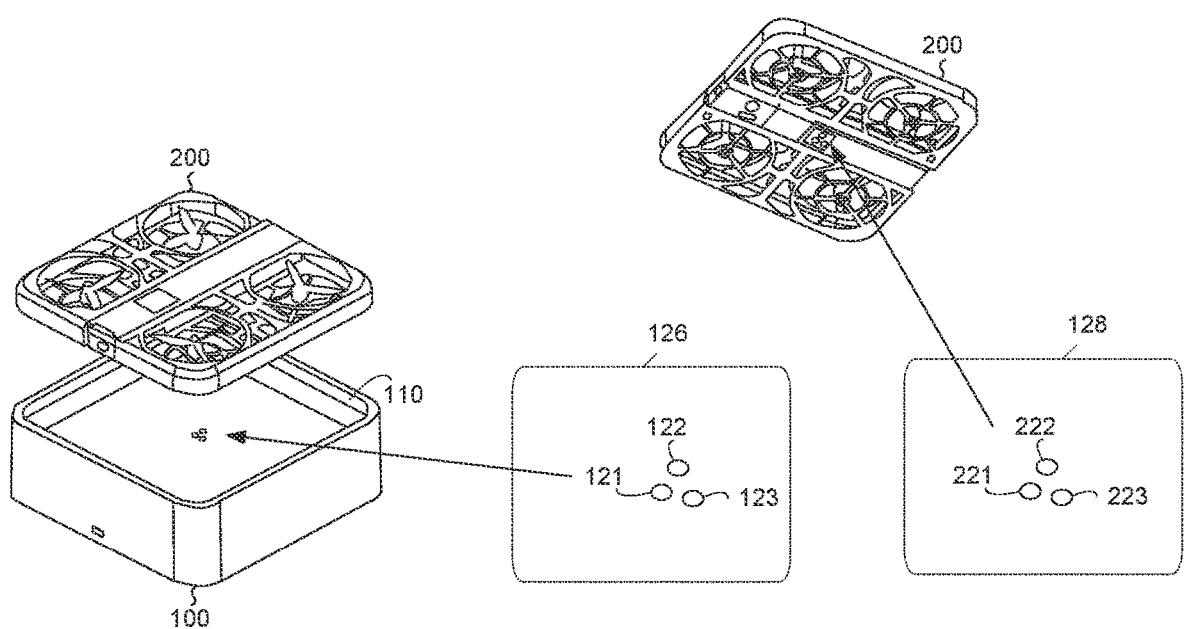
FIG. 1 illustrates an exemplary docking station for providing charging power to an exemplary unmanned aerial vehicle (UAV), according to some embodiments of the present disclosure.
Figure 4A:
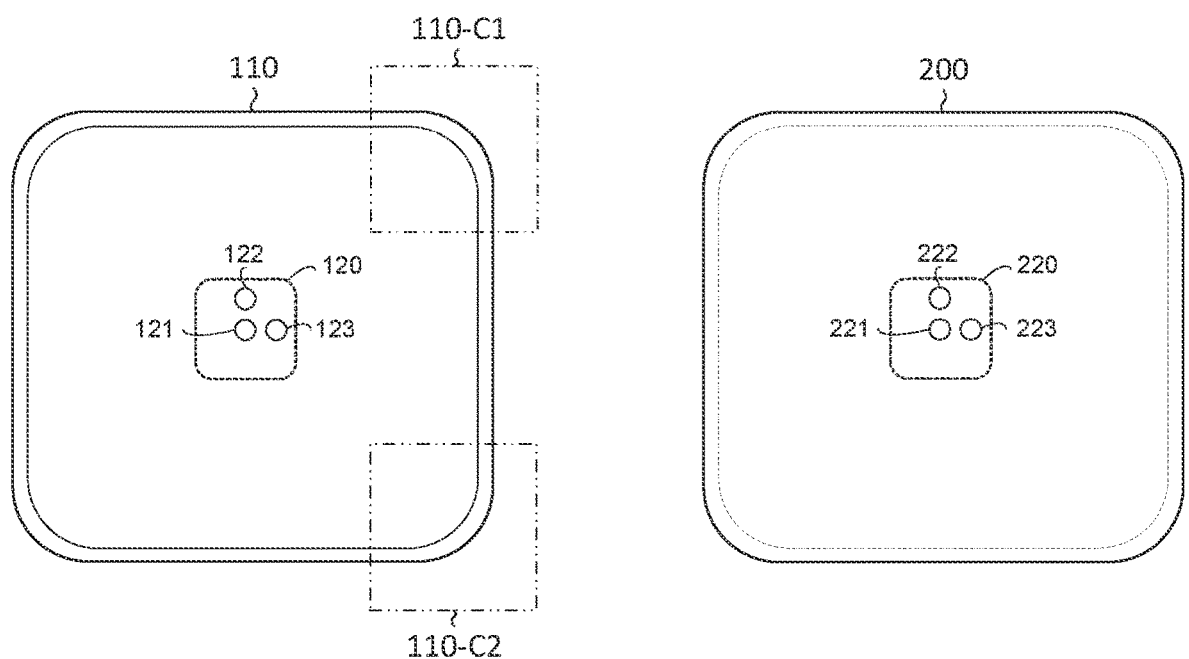
FIGS. 4A, 4B, and 4C are diagrams of exemplary L-shape power-supply contacts of the exemplary docking station in FIG. 1 and exemplary charging contacts of exemplary UAVs, according to some embodiments of the present disclosure.

FIG. 1 illustrates an exemplary docking station 100 for providing charging power to an exemplary unmanned aerial vehicle (UAV) 200, according to some embodiments of the present disclosure. As shown in FIG. 1, docking station 100 includes a docking portion 110 for UAV 200 to dock with. Docking station 100 also includes power-supply contacts 121, 122, and 123 mounted on a surface of docking portion 110 and arranged in an L shape from a top-view perspective 126. UAV 200 includes a power storage device (e.g., a battery) (not shown) and charging contacts 221, 222, and 223 mounted on its downward surface. Charging contacts 221, 222, and 223 are arranged in an L shape from a bottom view perspective 128 (FIG. 1) or from a top view perspective (FIG. 4A). As shown in FIG. 1, UAV 200 and docking portion 110 have a square shape. The embodiments in the present disclosure are not limited square docking portion 110. For example, the embodiments may also be adapted for practice with a rectangular docking portion. Some embodiments not including operations regarding corners of a docking portion may work on docking portions of any shape.

As shown in FIG. 1, a UAV system includes docking station 100 and UAV 200. UAV 200 may fly around indoors or outdoors to perform a mission and fly back to dock with docking station 100 for charging its power storage device (e.g., the battery). When UAV 200 docks with docking station 100 in an operative direction, charging contacts 221, 222, and 223 of UAV 200 are respectively coupled to power-supply contacts 121, 122, and 123 of docking station 100. When the contacts are coupled, docking station 100 is configured to supply power to charge UAV 200.

In some embodiments, from a perspective of docking station 100, UAV 200 is an external device. Docking station 100 is configured to provide charging power to the power storage device (e.g., the battery) of UAV 200 when UAV 200 docks with docking station 100. In some embodiments, the external device to dock with docking station 100 may be a laptop, a tablet, a smartphone, an appliance, an electronic component, a gadget, a machine, a medical device, a vehicle, an unmanned vehicle, an automatic vehicle, or any other apparatus having a power storage device to be charged. The power storage device of the external device may be a rechargeable battery, a secondary battery, a storage battery, an electrostatic double-layer capacitor, an electrochemical pseudocapacitor, a hybrid capacitor, a lithium-ion capacitor, or any other energy storage device or component.

Figure 2:
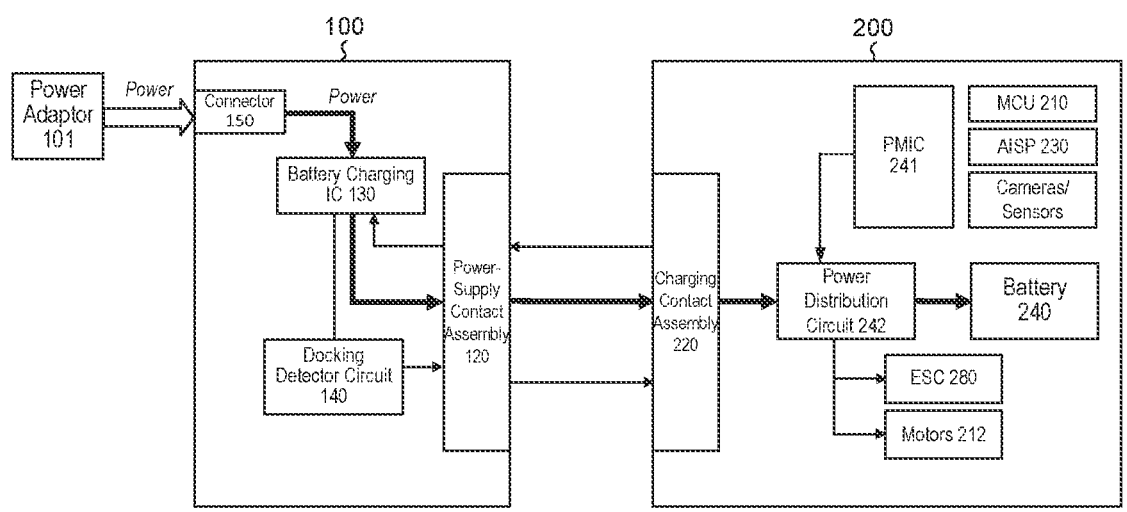
FIG. 2 is a block diagram of the exemplary docking station for providing charging power to the exemplary UAV in FIG. 1, according to some embodiments of the present disclosure.

FIG. 2 is a block diagram of exemplary docking station 100 for providing charging power to exemplary UAV 200 in FIG. 1, according to some embodiments of the present disclosure. As shown in FIG. 2, docking station 100 includes a power-supply contact assembly 120, a battery charging integrated circuit (IC) 130, a docking detector circuit 140, and a connector 150. Docking station 100 is coupled to a power adaptor 101 via connector 150. Power adaptor 101 is coupled to a power source (not shown) and configured to supply power to docking station 100. Battery charging integrated circuit (IC) 130 and docking detector circuit 140 are a control circuit of docking station 100. Power-supply contact assembly 120 includes power-supply contacts 121, 122, and 123 (FIG. 1).

Figure 3:
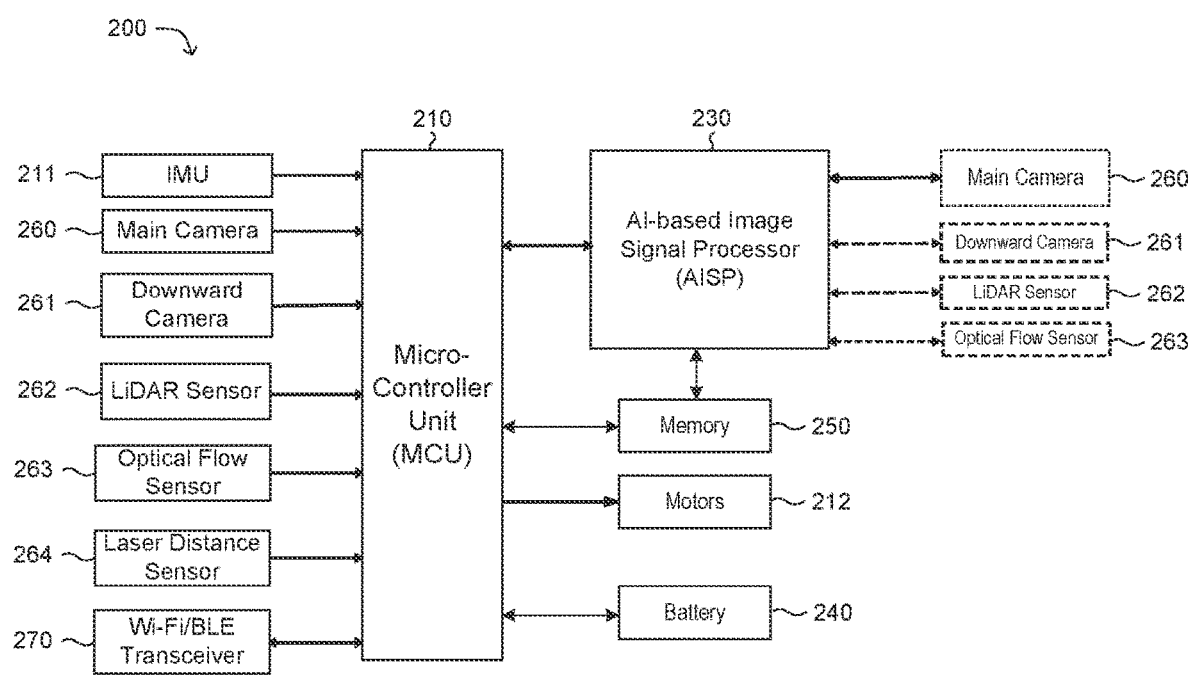
FIG. 3 is a block diagram of the exemplary UAV in FIG. 1, according to some embodiments of the present disclosure.

UAV 200 includes a micro-controller unit (MCU) 210, motors 212, a charging contact assembly 220, an artificial intelligence (AI) image signal processor (AISP) 230, a battery 240, a power management integrated circuit (PMIC) 241, a power distribution circuit 242, an electronic speed controller (ESC) 280, and cameras and sensors (FIG. 3). Charging contact assembly 220 includes charging contacts 221, 222, and 223 (FIG. 1). While MCU 210 is configured to perform and control operations for docking, AISP 230 may be configured to process images for flight missions. In some embodiments, AISP 230 may be configured to facilitate image recognition required in docking operations.

The control circuit (battery charging IC 130 and docking detector circuit 140) of docking station 100 is configured to detect whether UAV 200 docks with docking portion 110. For example, the control circuit of docking station 100 is configured to detect whether two or more of power-supply contacts 121, 122, and 123 (FIG. 1) on docking portion 110 (FIG. 1) are electrically coupled to two or more of charging contacts 221, 222, and 223 (FIG. 1) of UAV 200 by testing whether conductive contact is made between power-supply contacts 121, 122, and 123 and charging contacts 221, 222, and 223. As another example, power-supply contact assembly 120 and charging contact assembly 220 may have additional contacts (not shown) corresponding to each other. The control circuit of docking station 100 is configured to test if a conductive contact is made by these additional contacts to determine whether UAV 200 docks with docking station 100 in an operative direction. The operative direction means that all charging contacts of UAV 200 are electrically coupled to all corresponding power-supply contacts of docking station 100. In some embodiments, the operative direction means that at least two of the charging contacts of UAV 200 are electrically coupled to at least two power-supply contacts of docking station 100 to receive a positive and a negative voltage for charging battery 240.

When UAV 200 docks with docking station 100 in the operative direction, the control circuit detects that UAV 200 docks with docking portion 110. In response to detecting that UAV 200 docks with docking portion 110, battery charging IC 130 of the control circuit is configured to supply power to power-supply contacts 121, 122, and 123 on docking portion 110. Because UAV 200 docks with docking station 100 in the operative direction, charging contacts 221, 222, and 223 of UAV 200 are coupled to corresponding power-supply contacts 121, 122, and 123, respectively. In UAV 200, PMIC 241 is configured to control power distribution circuit 242 to distribute supplied power from charging contacts 221, 222, and 223 to battery 240. As a result, docking station 100 is configured supply power to charge battery 240 of UAV 200, as shown in FIG. 2.

FIG. 3 is a block diagram of exemplary UAV 200 in FIG. 1, according to some embodiments of the present disclosure. As shown in FIG. 3, UAV 200 includes MCU 210, an inertial measurement unit (IMU) 211, motors 212, AISP 230, battery 240, a memory 250, a main camera 260, a downward viewing camera 261, a light detection and ranging (LiDAR) sensor 262, an optical flow sensor 263, a laser distance sensor 264, and a Wi-Fi/Bluetooth low energy (BLE) transceiver 270. MCU 210 is configured to execute instructions stored in memory 250 to control UAV 200 to perform a flight mission based on images captured by main camera 260 and downward viewing camera 261, data sensed by IMU 211, LiDAR sensor 262, optical flow sensor 263, and laser distance sensor 264, and/or received Wi-Fi/BLE signals. AISP 230 is configured to perform image processing of the images and sensed data for the flight mission and/or for flight operations.

Optical flow sensor 263 is configured to capture images of docking portion 110 and recognize motion of docking portion 110 in the images caused by descending motion of UAV 200. In some embodiments, MCU 210 or AISP 230 is configured to control UAV 200 to fly above and align with docking portion 110 based, at least in part, on the sensed data (images) of optical flow sensor 263.

FIG. 4A is a diagram of exemplary L-shape power-supply contacts 121, 122, and 123 of exemplary docking station 100 in FIG. 1 and exemplary L-shape charging contacts 221, 222, and 223 of exemplary UAV 200 in FIG. 1, according to some embodiments of the present disclosure. As shown in FIG. 4A, docking portion 110 of docking station 100 has three power-supply contacts 121, 122, and 123 arranged in a first L shape from a top view perspective. UAV 200 has three charging contacts 221, 222, and 223 arranged in a second L shape from the top view perspective. Dimensions of the first and second L shapes are the same. Docking portion 110 includes four corners.

When UAV 200 needs to charge its battery 240 (FIGS. 2 and 3) or completes its flight mission, MCU 210 (FIG. 3) is configured to execute the instructions stored in memory 250 to control UAV 200 to fly back to and approach docking station 100 based on, for example, signal strength of Wi-Fi/BLE signals estimated by Wi-Fi/BLE transceiver 270, images of docking portion 110 acquired by downward viewing camera 261 and/or sensed by optical flow sensor 263, images captured by main camera 260, and/or acceleration and rotation data measured by IMU 211 (FIG. 3). Alternatively, UAV 200 is configured to record its flight routes in memory 250 when it departs from docking station 100. When UAV 200 completes its flight mission, MCU 210 (FIG. 3) is configured to execute the instructions stored in memory 250 to control UAV 200 to fly back to and approach docking station 100 based on the recorded routes in memory 250.

When UAV 200 flies back to and approaches docking station 100 to dock, MCU 210 (FIG. 3) is configured to execute the instructions stored in memory 250 to control UAV 200 to fly above and align with docking portion 110 by matching adjacent template corner images 110-C1 and 110-C2, retrieved from memory 250, with corners of docking portion 110 in downward images acquired by downward viewing camera 261. For example, when UAV 200 flies back to and approaches docking station 100 to dock, downward viewing camera 261 of UAV 200 is configured to acquire downward images. Laser distance sensor 264 is configured to sense downward distances between UAV 200 and docking portion 110. MCU 210 (FIG. 3) is configured to, or control AISP 230 (FIG. 3) to receive one or more of the downward images acquired by downward viewing camera 261 (FIG. 3) and/or the distance data sensed by laser distance laser 264 or LiDAR sensor 262. MCU 210 or AISP 230 is configured to recognize template corner images 110-C1 and 110-C2 in the downward images by, for example, template matching. In some embodiments, in calculating match rates between template corner images 110-C1 and 110-C2 and the downward images, MCU 210 or AISP 230 is configured to adjust the image sizes of template corner images 110-C1 and 110-C2 or of the downward images based on the distance data. After MCU 210 or ASIP 230 recognizes the two corners of square docking portion 110 based on the downward images, or based on the downward images and the distance data, MCU 210 is configured to control UAV 200 to fly above and align two adjacent corners of UAV 200 with the two corners of docking portion 110 corresponding to template corner images 110-C1 and 110-C2.

In some embodiments, MCU 210 or AISP 230 is configured to recognize two corners at two opposite vertices of square docking portion 110 in the downward images by the template matching, instead of adjacent corners, for UAV 200 to fly above and align with docking portion 110. In some embodiments, MCU 210 or AISP 230 is configured to recognize three or four corners of docking portion 110 in the downward images by the template matching, for UAV 200 to fly above and align with docking portion 110.

In some embodiments, MCU 210 or AISP 230 is configured to recognize two corners at two opposite vertices of square docking portion 110 based on image data sensed by optical flow sensor 263, for UAV 200 to fly above and align with docking portion 110. In some embodiments, MCU 210 or AISP 230 is configured to recognize three or four corners of docking portion 110 image data sensed by optical flow sensor 263, for UAV 200 to fly above and align with docking portion 110.

In some embodiments, when UAV 200 flies back to and approaches docking station 100 to dock, MCU 210 (FIG. 3) is configured to execute the instructions stored in memory 250 to control UAV 200 to fly above and align with docking portion 110 by recognizing the first L shape of the plurality of power-supply contacts on the docking portion. For example, when UAV 200 flies back to and approaches docking station 100 to dock, downward viewing camera 261 of UAV 200 is configured to acquire downward images. The downward images include the first L shape of the plurality of power-supply contacts on docking portion 110. MCU 210 (FIG. 3) is configured to, or controls AISP 230 (FIG. 3) to, receive one or more of the downward images acquired by downward viewing camera 261 (FIG. 3). MCU 210 or AISP 230 is configured to recognize the first L shape of the plurality of power-supply contacts on docking portion 110 in the downward images by, for example, template matching. After MCU 210 or ASIP 230 recognizes the first L shape of the plurality of power-supply contacts on docking portion 110, MCU 210 is configured to control UAV 200 to fly above and align UAV 200 with docking portion 110.

In some embodiments, when UAV 200 flies back to and approaches docking station 100 to dock, MCU 210 (FIG. 3) is configured to execute the instructions stored in memory 250 to control UAV 200 to fly above and align with docking portion 110 by recognizing the plurality of power-supply contacts on docking portion 110. For example, when UAV 200 flies back and approaches docking station 100 to dock, downward viewing camera 261 of UAV 200 is configured to acquire downward images. The downward images include the plurality of power-supply contacts on the docking portion. Laser distance sensor 264 is configured to sense downward distances between UAV 200 and docking portion 110. MCU 210 (FIG. 3) is configured to, or controls AISP 230 (FIG. 3) to, receive one or more of the downward images acquired by downward viewing camera 261 (FIG. 3). MCU 210 or AISP 230 is configured to recognize the plurality of power-supply contacts on docking portion 110 in the downward images by, for example, template matching. In some embodiments, in calculating match rates between a template image of the plurality of power-supply contacts and the downward images, MCU 210 or AISP 230 is configured to adjust the size of the downward images or of the template image based on the distance data. After MCU 210 or ASIP 230 recognizes the plurality of power-supply contacts on docking portion 110 based on the downward images, or based on the downward images and the distance data, MCU 210 is configured to control UAV 200 to fly above and align UAV 200 with docking portion 110.

After UAV 200 flies above and aligns with docking portion 110, there may be an angle offset of 90, 180, or 270 degrees between the second L shape of charging contacts 221, 222, and 223 and the first L shape of power-supply contacts 121, 122, and 123 because four corners of square docking portion 110 look the same. MCU 210 or AISP 230 is configured to determine an angle offset value as 0, 90, 180, or 270 degrees based on the first L shape in the downward images and send the angle offset value to MCU 210. MCU 210 is configured to execute the instructions stored in memory 250 to align the second L shape of charging contacts 221, 222, and 223 with the first L shape of power-supply contacts 121, 122, and 123 by rotating UAV 200 90, 180, or 270 degrees relative to docking portion 110 if needed.

After the second L shape aligns with the first L shape, MCU 210 is configured to execute the instructions stored in memory 250 to decrease a height of UAV 200 to dock with docking portion 110, so that charging contacts 221, 222, and 223 of UAV 200 are electrically coupled to power-supply contacts 121, 122, and 123 of docking portion 110, respectively.

As shown in FIG. 4A, docking portion 110 includes three power-supply contacts 121, 122, and 123 arranged in the first L shape on its surface. Power-supply contact 121 is arranged at a corner of the first L shape. Power-supply contacts 122 and 123 are arranged at two ends of the first L shape. When UAV 200 docks with docking portion 110, power-supply contact 121 is configured, by battery charging IC 130, to supply a positive voltage, e.g., 5, 15, or 25 volts (V), to charging contact 221 of UAV 200. Power-supply contacts 122 and/or 123 are configured, by battery charging IC 130, to supply a negative voltage to charging contacts 222 and/or 223 of UAV 200, respectively. The negative voltage is defined as a lower voltage level than the positive voltage, such as a ground level.

Alternatively, when UAV 200 docks with docking portion 110, power-supply contact 121 is configured, by battery charging IC 130, to supply the negative voltage (e.g., the ground level) to charging contact 221 of UAV 200. Power-supply contacts 122 and/or 123 are configured, by battery charging IC 130, to supply the positive voltage, e.g., 5, 15, or 25 V, to charging contacts 222 and/or 223 of UAV 200, respectively.

As described above with reference to FIGS. 2 and 4A, when docking station 100 detects that UAV 200 docks with docking portion 110, battery charging IC 130 of docking station 100 is configured to supply power to power-supply contacts 121, 122, and 123 on docking portion 110. More particularly, the control circuit (battery charging IC 130 and docking detector circuit 140) of docking station 100 is configured to detect whether two or more of power-supply contacts 121, 122, and 123 (FIGS. 1 and 4A) on docking portion 110 (FIGS. 1 and 4A) are electrically coupled to two or more of charging contacts 221, 222, and 223 (FIGS. 1 and 4A) of UAV 200. For example, if UAV 200 aligns the second L shape of charging contacts with the first L shape of power-supply contacts on docking portion 110 and docks with docking station 100, the control circuit is configured to detect power-supply contacts 121, 122, and 123 are electrically coupled to corresponding charging contacts 221, 222, and 223. If UAV 200 does not align the second L shape with the first L shape and docks with docking station 100 with an angular rotation of, for example, 90 degrees, the control circuit is configured to detect power-supply contacts 121 and 122 are electrically coupled to charging contacts 221 and 223, respectively, or power-supply contacts 121 and 123 are electrically coupled to charging contacts 221 and 222, respectively. If UAV 200 docks with docking station 100 with an angle rotation of 180 degrees, the control circuit is configured to detect only power-supply contact 121 is electrically coupled to charging contact 221. As a result, the control circuit does not detect two or more of the power-supply contacts 121, 122, and 123 on docking portion 110 are electrically coupled to charging contacts 221, 222, and 223 of UAV 200.

In response to detecting that the two or more of the power-supply contacts on docking portion 110 are electrically coupled to the charging contacts of UAV 200, battery charging IC 130 of the control circuit is configured to supply power to the two or more of the power-supply contacts on the docking portion. For example, when the control circuit (battery charging IC 130 and docking detector circuit 140) detects power-supply contacts 121 and 122; or 121 and 123; or 121, 122, and 123 are electrically coupled to corresponding charging contacts 221 and 223; or 221 and 222; or 221, 222, and 223, respectively, battery charging IC 130 is configured to supply power to the detected power-supply contacts 121 and 122; or 121 and 123; or 121, 122, and 123 on docking portion 110. In some embodiments, battery charging IC 130 of the control circuit is configured to supply power to all power-supply contacts 121, 122, and 123 on docking portion 110 in response to detecting that two or three of power-supply contacts 121, 122, and 123 are electrically coupled to corresponding two or three of charging contacts 221, 222, and 223 of UAV 200, respectively.

In some embodiments, in response to detecting that two or more of power-supply contacts 121, 122, and 123 are electrically coupled to corresponding two or more of charging contacts 221, 222, and 223 of UAV 200, battery charging IC 130 of the control circuit is configured to supply power to only two of power-supply contacts 121, 122, and 123 on docking portion 110 because two power-supply contacts are sufficient to provide the positive and negative voltages to charge UAV 200. For example, when the control circuit (battery charging IC 130 and docking detector circuit 140) detects all power-supply contacts 121, 122, and 123 are electrically coupled to charging contacts 221, 222, and 223, respectively, battery charging IC 130 is configured to supply power to only power-supply contacts 121 and 122, or only 121 and 123. When the control circuit (battery charging IC 130 and docking detector circuit 140) detects power-supply contacts 121 and 122, or 121 and 123, are electrically coupled to corresponding charging contacts 221 and 223, or 221 and 222, battery charging IC 130 is also configured to supply power to only power-supply contacts 121 and 122, or 121 and 123.

Figure 4B:
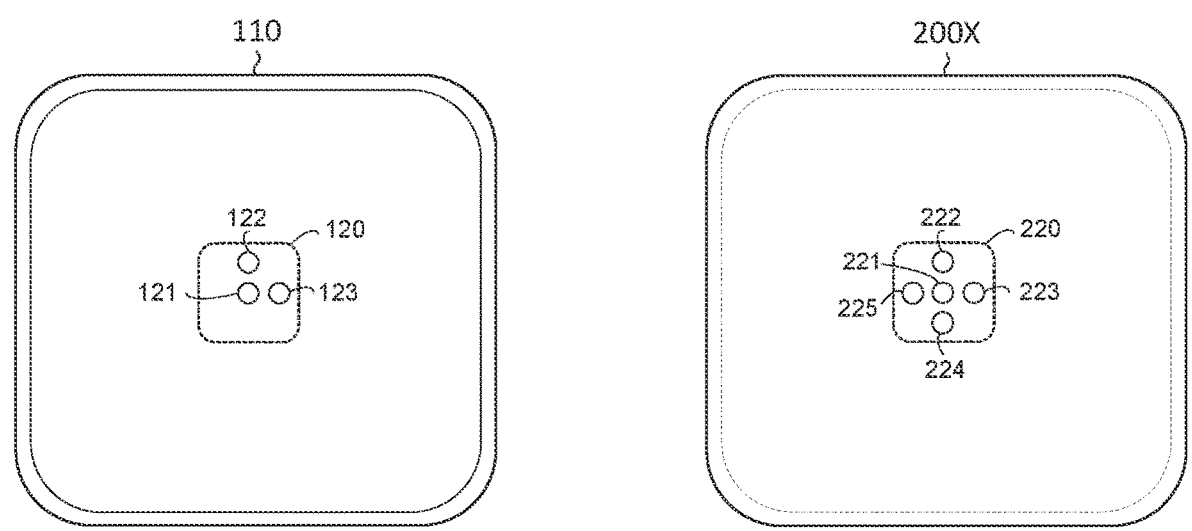

FIG. 4B is a diagram of exemplary L-shape power-supply contacts 121-123 of exemplary docking station 100 in FIG. 1 and exemplary cross-shape charging contacts of an exemplary UAV 200X, according to some embodiments of the present disclosure. As shown in FIG. 4B, docking portion 110 of docking station 100 has three power-supply contacts 121, 122, and 123 arranged in the first L shape from a top view perspective. UAV 200X has five charging contacts 221, 222, 223, 224, and 225 arranged in a cross shape. Charging contact 221 at a center of the cross shape and charging contacts 222 and 223 at two ends of the cross shape form a second L shape from the top view perspective. Alternatively, charging contacts 221, 223, and 224; or 221, 224, and 225; or 221, 225, and 222 may form the second L shape. Dimensions of the first and second L shapes are the same. Accordingly, UAV 200X can dock with docking portion 110 in any of the four angular orientations corresponding to the four different ways the charging contacts having the second L shape can align with power-supply contacts 121, 122, and 123 of docking portion 110 having the first L shape.

UAV 200X has all the components and functions described for UAV 200, except a different number and arrangement of charging contacts. For example, a control circuit (e.g., battery charging IC 130 and docking detector circuit 140) of UAV 200X is configured to control UAV 200X to fly above and align with docking portion 110 and decrease a height of UAV 200X to dock with docking portion 110, as described above for UAV 200 with reference to FIGS. 1-3 and 4A. The controller of UAV 200X is configured to control UAV 200X to fly above and align with docking portion 110, by receiving one or more downward images and downward distance data and recognizing two or more of the four corners of docking portion 110 based on the one or more downward images and the downward distance data, before decreasing the height of UAV 200X to dock with docking portion 110.

Docking station 100 and UAV 200X form a UAV system and operate with each other similar to those operations between docking station 100 and UAV 200 described above with reference to FIGS. 1-4A.

Figure 4C:
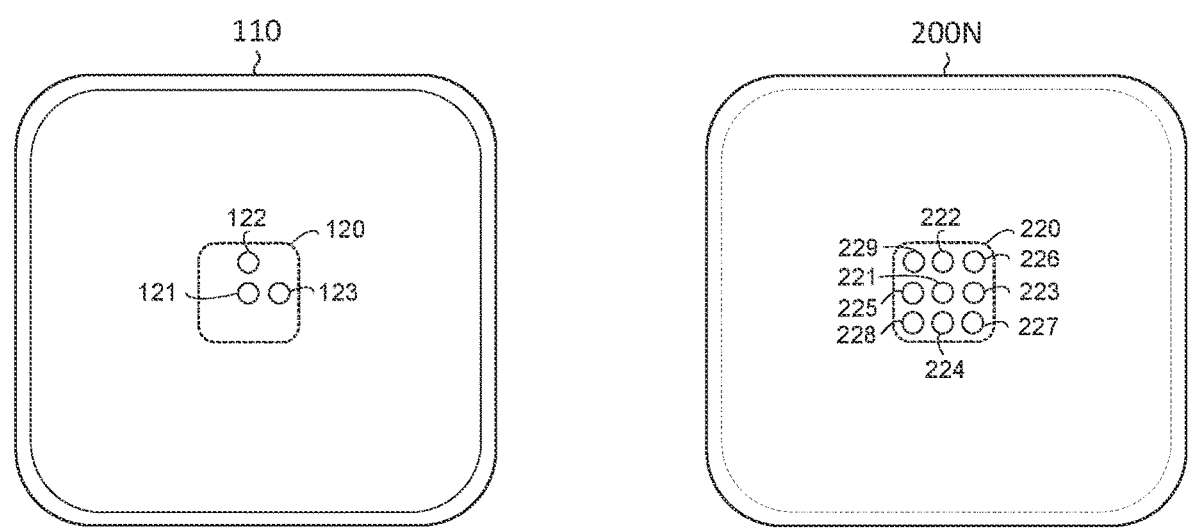

FIG. 4C is a diagram of exemplary L-shape power-supply contacts 121-123 of exemplary docking station 100 in FIG.

1 and exemplary nine-square charging contacts of an exemplary UAV 200N, according to some embodiments of the present disclosure. As shown in FIG. 4C, docking portion 110 of docking station 100 has three power-supply contacts 121, 122, and 123 arranged in the first L shape from a top view perspective. UAV 200N has nine charging contacts 221, 222, 223, 224, 225, 226, 227, 228, and 229 arranged in a nine-square configuration. Charging contact 221 at a center of the nine-square configuration and charging contacts 222 and 223 at centers of two adjacent sides of the nine-square configuration form a second L shape from the top view perspective. Alternatively, charging contacts 221, 223, and 224; or 221, 224, and 225; or 221, 225, and 222 may form the second L shape. Accordingly, UAV 200N can dock with docking portion 110 in any of the four angular orientations corresponding to the four different ways the charging contacts having the second L shape can align with power supply contacts 121, 122, and 123 of docking portion 110 having the first L shape. Dimensions of the first and second L shapes are the same.

UAV 200N has all the components and functions described for UAV 200, except a different number and arrangement of charging contacts. For example, a control circuit (e.g., battery charging IC 130 and docking detector circuit 140) of UAV 200N is configured to control UAV 200N to fly above and align with docking portion 110 and decrease a height of UAV 200N to dock with docking portion 110, as described above for UAV 200 with reference to FIGS. 1-3 and 4A. The controller of UAV 200N is configured to control UAV 200N to fly above and align with docking portion 110, by receiving one or more downward images and downward distance data and recognizing two or more of the four corners of docking portion 110 based on the one or more downward images and the downward distance data, before decreasing the height of UAV 200N to dock with docking portion 110.

Docking station 100 and UAV 200N form a UAV system and operate with each other similar to those operations between docking station 100 and UAV 200 or 200X (FIG. 4B) described above with reference to FIGS. 1-4A or FIG. 4B.

Figure 5A:
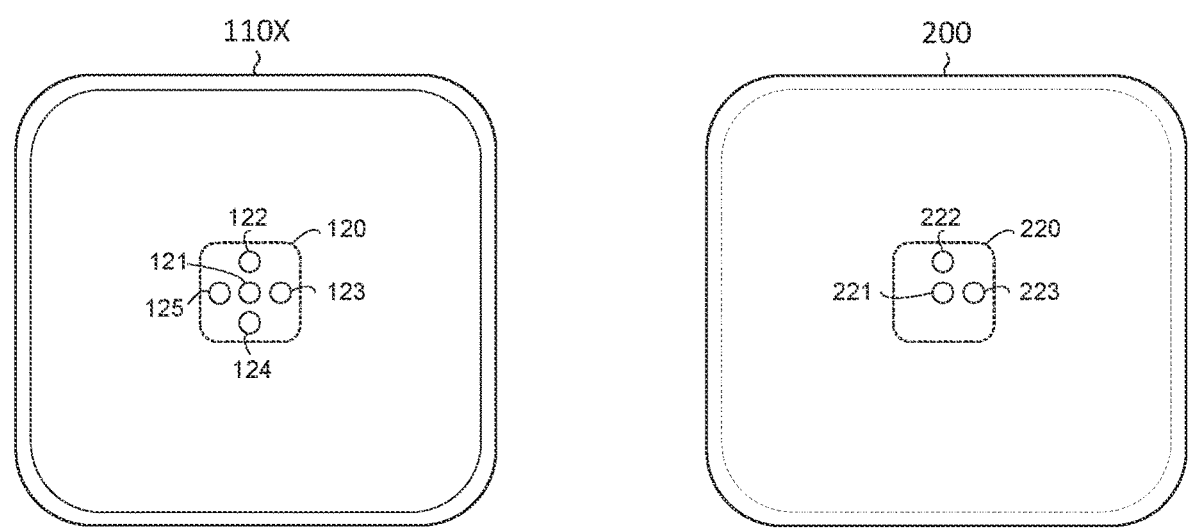
FIGS. 5A, 5B, and 5C are diagrams of exemplary cross-shape power-supply contacts of an exemplary docking station and exemplary charging contacts of exemplary UAVs, according to some embodiments of the present disclosure.

FIG. 5A is a diagram of exemplary cross-shape power-supply contacts of an exemplary docking station 100X (not shown) and exemplary L-shape charging contacts 221-223 of exemplary UAV 200 in FIG. 1, according to some embodiments of the present disclosure. Docking station 100X has all the components and functions described herein for docking station 100, except a different number and arrangement of power-supply contacts. As shown in FIG. 5A, a docking portion 110X of docking station 100X has five power-supply contacts 121, 122, 123, 124, and 125 mounted on its surface and arranged in a cross shape from a top view perspective.

As shown in FIG. 5A, power-supply contact 121 is arranged at a cross point of the cross shape. Remaining four power-supply contacts 122, 123, 124, and 125 are arranged at four ends of the cross shape. Power-supply contact 121 is configured to supply a positive voltage and power-supply contacts 122, 123, 124, and 125 at the four ends are configured to supply a negative voltage (e.g., a ground level). In some embodiments, power-supply contact 121 is configured to supply the negative voltage (e.g., the ground level) and power-supply contacts 122, 123, 124, and 125 at the four ends are configured to supply the positive voltage.

In FIG. 5A, power-supply contact 121 at the center of the cross shape and power-supply contacts 122 and 123 at two ends of the cross shape are arranged in the first L shape from a top view perspective. Alternatively, power-supply contacts 121, 123, and 124; or 121, 124, and 125; or 121, 125, and 122 may form the first L shape. Charging contacts 221, 222, and 223 of UAV 200 are arranged in the second L shape from the top view perspective. Dimensions of the first and second L shapes are the same. Accordingly, UAV 200 can dock with docking portion 110X in any of the four angular orientations corresponding to the four different ways the power supply contacts having the first L shape can align with charging contacts 221, 222, and 223 of UAV 200 having the second L shape.

Docking station 100X and UAV 200 form a UAV system and operate with each other similar to those operations between docking station 100 and UAV 200, 200X (FIG. 4B), or 200N (FIG. 4C) described above with reference to FIGS. 1-4A, or FIG. 4B, or FIG. 4C.

Figure 5B:
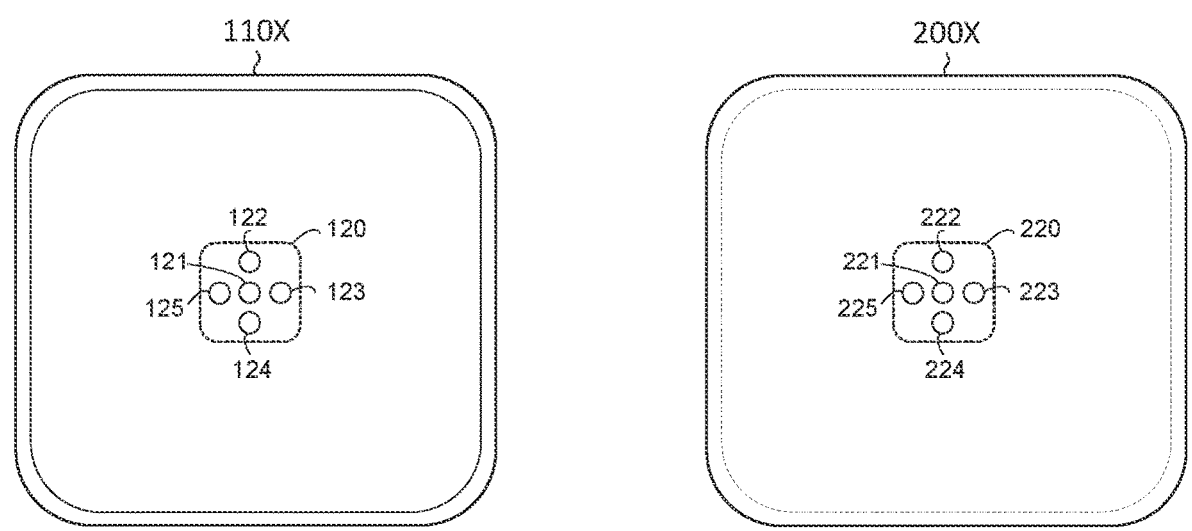

FIG. 5B is a diagram of exemplary cross-shape power-supply contacts 121-125 of exemplary docking station 100X (not shown) and exemplary cross-shape charging contacts 221-225 of exemplary UAV 200X, according to some embodiments of the present disclosure. As shown in FIG. 5B, power-supply contacts 121-125 on docking portion 110X are arranged in a first cross shape from a top view perspective. Charging contacts 221-225 of UAV 200X are arranged in a second cross shape from the top view perspective. Dimensions of the first and second cross shapes are the same.

The second cross shape of charging contacts 221-225 may be coupled to the first cross shape of power-supply contacts 121-125 in four different orientations. Power-supply contact 121 is configured to provide a positive voltage and power-supply contacts 122-125 are configured to provide a negative voltage (e.g., a ground level). Power-supply contacts 121-125 are able to supply power to charging contacts 221-225 in any of the four orientations. In some embodiments, power-supply contact 121 is configured to provide the negative (e.g., the ground level) and power-supply contacts 122-125 are configured to provide the positive voltage. Power-supply contacts 121-125 are able to supply power to charging contacts 221-225 in any of the four orientations.

Docking station 100X and UAV 200X form a UAV system and operate with each other similar to those operations between docking station 100 and UAV 200, or 200X (FIG. 4B), or 200N (FIG. 4C) described above with reference to FIGS. 1-4A, or FIG. 4B, or FIG. 4C; or between docking station 100X and UAV 200 described above with reference to FIG. 5A.

Figure 5C:
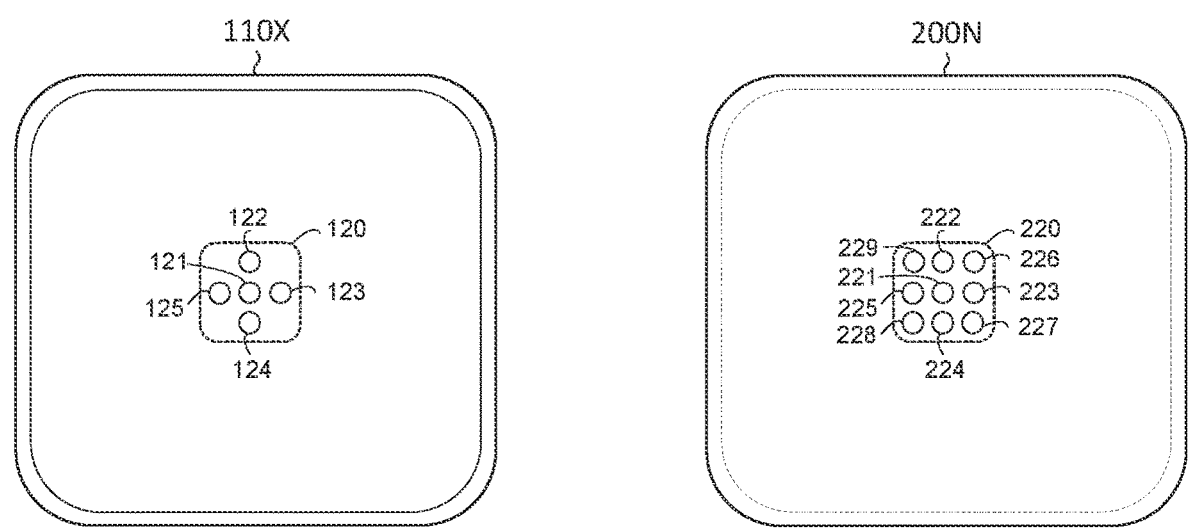

FIG. 5C is a diagram of exemplary cross-shape power-supply contacts 121-125 of exemplary docking station 100X (not shown) and exemplary nine-square charging contacts 221-229 of exemplary UAV 200N, according to some embodiments of the present disclosure. As shown in FIG. 5C, power-supply contacts 121-125 on docking portion 110X are arranged in a first cross shape from a top view perspective. Charging contacts 221-229 of UAV 200N are arranged in a nine-square configuration. Charging contact 221 at a center of the nine-square configuration and charging contacts 222-225 at centers of four sides of the nine-square configuration are arranged in a second cross shape. Dimensions of the first and second cross shapes are the same.

The second cross shape of charging contacts 221-225 (FIG. 5C) may be coupled to the first cross shape of power-supply contacts 121-125 in four different directions, as described above with reference to FIG. 5B. Power-supply contact 121 and power-supply contacts 122-125 are configured to provide the positive and negative voltages, or the negative and positive voltages, as described above with reference to FIG. 5B.

Docking station 100X and UAV 200N form a UAV system and operate with each other similar to those operations between docking station 100 and UAV 200, or 200X (FIG. 4B), or 200N (FIG. 4C) described above with reference to FIGS. 1-4A, or FIG. 4B, or FIG. 4C; or between docking station 100X and UAV 200 or 200X described above with reference to FIG. 5A or 5B.

Figure 6A:
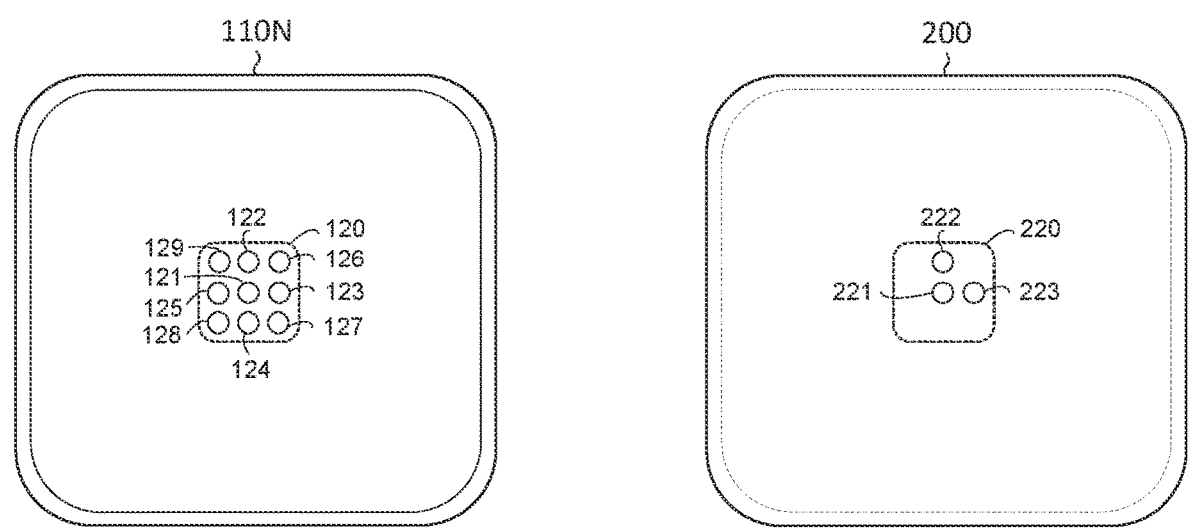
FIGS. 6A, 6B, and 6C are diagrams of exemplary nine-square power-supply contacts of an exemplary docking station and exemplary charging contacts of exemplary UAVs, according to some embodiments of the present disclosure.

FIG. 6A is a diagram of exemplary nine-square power-supply contacts of an exemplary docking station 100N (not shown) and exemplary L-shape charging contacts 221-223 of exemplary UAV 200 in FIG. 1, according to some embodiments of the present disclosure. Docking station 100N has all the components and functions described herein for docking station 100, except difference in power-supply contacts. As shown in FIG. 6A, docking portion 110N of docking station 100N has nine power-supply contacts 121, 122, 123, 124, 125, 126, 127, 128, and 129 mounted on its surface and arranged in a nine-square configuration from a top view perspective.

As shown in FIG. 6A, power-supply contact 121 is arranged at a center of the nine-square configuration. Four power-supply contacts 122-125 are arranged at centers of four sides of the nine-square configuration. Four power-supply contacts 126-129 are arranged at four corners of the nine-square configuration. Power-supply contact 121 is configured to supply a positive voltage. Power-supply contacts 122-125 at the centers of the four sides are configured to supply a negative voltage. In some embodiments, power-supply contact 121 is configured to supply the negative voltage. Power-supply contacts 122-125 at the centers of the four sides are configured to supply the positive voltage.

In FIG. 6A, power-supply contact 121 at the center of the nine-square configuration and power-supply contacts 122 and 123 at centers of two adjacent sides of the nine-square configuration are arranged in a first L shape. Alternatively, power-supply contacts 121, 123, and 124; or 121, 124, and 125; or 121, 125, and 122 may form the first L shape. Charging contacts 221, 222, and 223 of UAV 200 are arranged in a second L shape. Dimensions of the first and second L shapes are the same. Accordingly, UAV 200 can dock with docking portion 110N in any of the four angular orientations corresponding to the four different ways the power supply contacts having the first L shape can align with charging contacts 221, 222, and 223 of UAV 200 having the second L shape.

Docking station 100N and UAV 200 form a UAV system and operate with each other similar to those operations between docking station 100 and UAV 200, or 200X (FIG. 4B), or 200N (FIG. 4C) described above with reference to FIGS. 1-4A, or FIG. 4B, or FIG. 4C; or between docking station 100X and UAV 200 (FIG. 5A), or 200X (FIG. or 200N (FIG. 5C) described above with reference to FIG. 5A, 5B, or 5C.

Figure 6B:
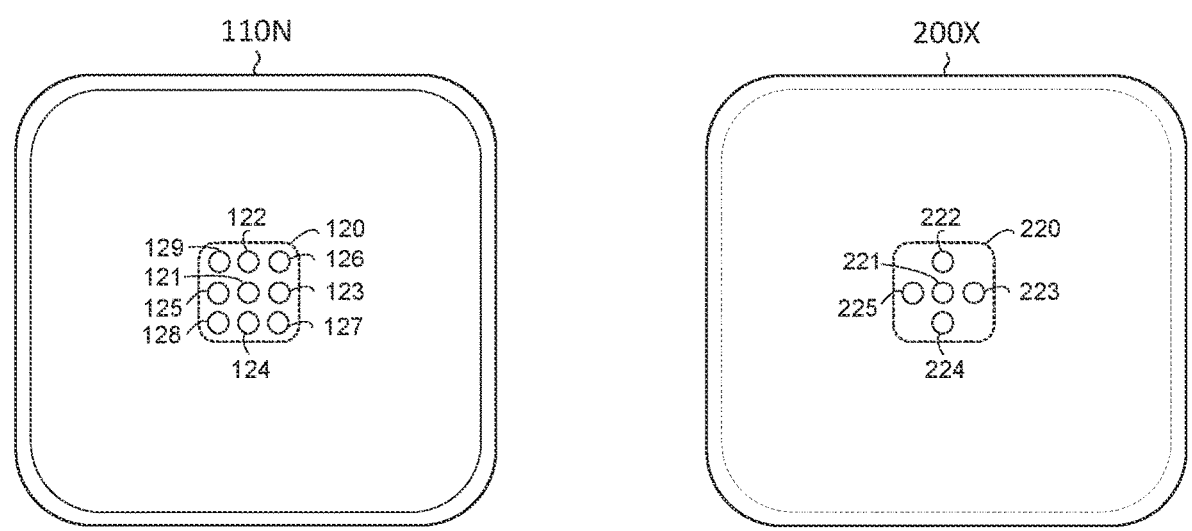

FIG. 6B is a diagram of exemplary nine-square power-supply contacts 121-129 of exemplary docking station 100N (not shown) and exemplary cross-shape charging contacts 221-225 of exemplary UAV 200X, according to some embodiments of the present disclosure. As shown in FIG. 6B, power-supply contact 121 at a center of the nine-square configuration and power-supply contacts 122-125 at centers of four sides of the nine-square configuration are arranged in a first cross shape. Charging contacts 221-225 of UAV 200X are arranged in a second cross shape. Dimensions of the first and second cross shapes are the same.

Docking station 100N and UAV 200X form a UAV system and operate with each other similar to those operations between docking station 100 and UAV 200, or 200X (FIG. 4B), or 200N (FIG. 4C) described above with reference to FIGS. 1-4A, or FIG. 4B, or FIG. 4C; or between docking station 100X and UAV 200 (FIG. 5A), 200X (FIG. 5B), or 200N (FIG. 5C) described above with reference to FIG. 5A, 5B, or 5C; or between docking station 100N and UAV 200 (FIG. 6A) described above with reference to FIG. 6A.

Figure 6C:
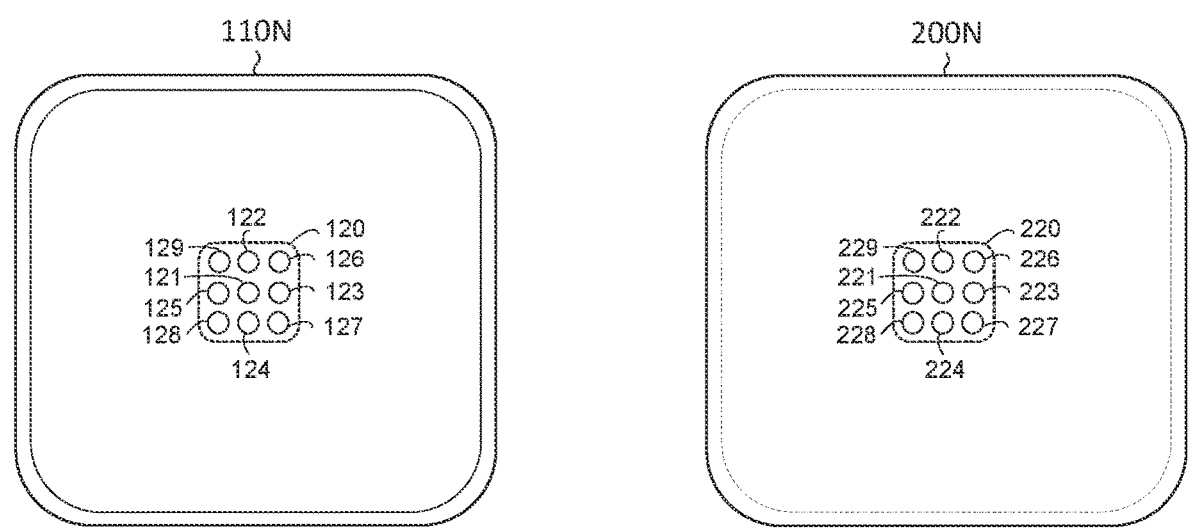

FIG. 6C is a diagram of exemplary nine-square power-supply contacts 121-129 of exemplary docking station 100N (not shown) and exemplary nine-square charging contacts 221-229 of exemplary UAV 200N, according to some embodiments of the present disclosure. As shown in FIG. 6C, power-supply contacts 121-129 on docking portion 110N are arranged in a first nine-square configuration. Charging contacts 221-229 of UAV 200N are arranged in a second nine-square configuration. Dimensions of the first and second nine-square configurations are the same.

Docking station 100N and UAV 200N forms a UAV system and operate with each other similar to those operations between docking station 100 and UAV 200, or 200X (FIG. 4B), or 200N (FIG. 4C) described above with reference to FIGS. 1-4A, or FIG. 4B, or FIG. 4C; or between docking station 100X and UAV 200 (FIG. 5A), 200X (FIG. 5B), or 200N (FIG. 5C) described above with reference to FIG. 5A, 5B, or 5C; or between docking station 100N and UAV 200 (FIG. 6A) or 200X (FIG. 6B) described above with reference to FIG. 6A or 6B.

In some embodiments, the second cross shape of charging contacts 221-225 may be coupled to the first cross shape of power-supply contacts 121-125 in four different orientations. Power-supply contact 121-125 are configured to provide a positive voltage and power-supply contacts 126-129 are configured to provide a negative voltage (e.g., a ground level). Power-supply contacts 121-129 are able to supply power to charging contacts 221-229 in any of the four orientations. In some embodiments, power-supply contacts 121-125 are configured to provide the negative (e.g., the ground level) and power-supply contacts 126-129 are configured to provide the positive voltage. Power-supply contacts 121-129 are able to supply power to charging contacts 221-229 in any of the four orientations.

Figure 7:
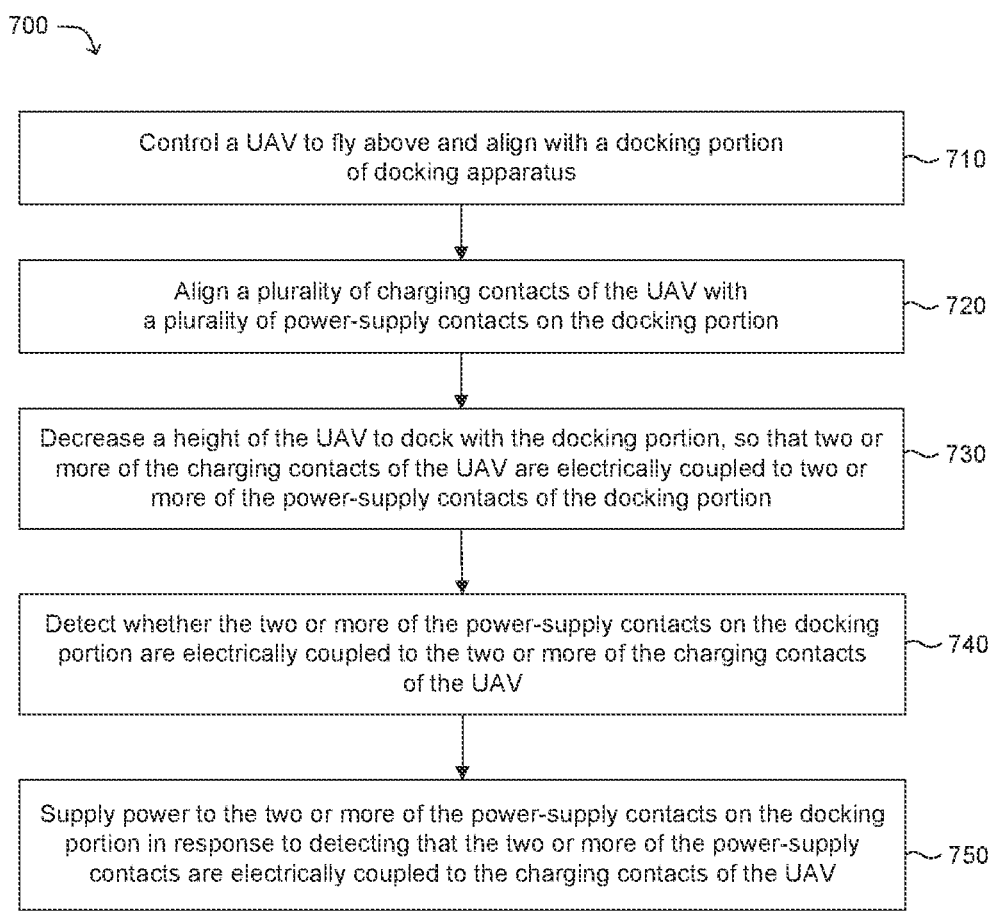
FIG. 7 is a flow chart of an exemplary method for providing charging power to the exemplary UAV in FIG. 1, according to some embodiments of the present disclosure.

FIG. 7 is a flow chart of an exemplary method 700 for providing charging power to exemplary UAV 200, 200X, or 200N, according to some embodiments of the present disclosure. Method 700 may be practiced by apparatus and devices disclosed and illustrated in the present disclosure for providing charging power to a power storage device of a UAV. Method 700 includes controlling the UAV to fly above and align with a docking portion of docking apparatus (step 710), aligning a plurality of charging contacts of the UAV with a plurality of power-supply contacts on the docking portion (step 720), decreasing a height of the UAV to dock with the docking portion, so that two or more of the charging contacts of the UAV are electrically coupled to two or more of the power-supply contacts of the docking portion (step 730), detecting whether two or more of the power-supply contacts on the docking portion are electrically coupled to two or more of the charging contacts of the UAV (step 740), and supplying power to at least two of the two or more of the power-supply contacts on the docking portion in response to detecting that the two or more of the power-supply contacts are electrically coupled to the charging contacts of the UAV (step 750).

Step 710 includes controlling the UAV to fly above and align with a docking portion of docking apparatus. For example, as described above with reference to FIGS. 1-3 and 4A, MCU 210 (FIG. 3) of UAV 200 is configured to execute the instructions stored in memory 250 to control UAV 200 to fly above and align with docking portion 110 of docking station 100 by matching two corners of template corner images 110-C1 and 110-C2, or by recognizing the first L shape of the plurality of power-supply contacts on the docking portion based on the downward image, or by recognizing the plurality of power-supply contacts on the docking portion based on the downward image and the downward distance data. As another example, MCU 210 (FIG. 3) of UAV 200X or 200N is configured to execute the instructions stored in memory 250 to control UAV 200 to fly above and align with docking portion 110 of docking station 100 by recognizing the first cross shape (FIGS. 5B, 5C, and 6A-6C) or the nine-square configuration (FIGS. 6A-6C) of the plurality of power-supply contacts on the docking portion based on the downward image, or based on the downward image and the downward distance data.

Step 720 includes aligning a plurality of charging contacts of the UAV with a plurality of power-supply contacts on the docking portion. For example, as described above with reference to FIGS. 1-3 and 4A, three power-supply contacts 121-123 on docking portion 110 are arranged in the first L shape. Three charging contacts 221-223 of UAV 200 are arranged in the second L shape. The dimensions of the first and second L shapes are the same. After UAV 200 flies above and aligns with docking portion 110, MCU 210 of UAV 200 is configured to align the second L shape of charging contacts 221-223 with the first L shape of power-supply contacts 121-123 by rotating UAV 200 90, 180, or 270 degrees relative to docking portion 110 if needed. As another example, after UAV 200 flies above and aligns with docking portion 110X or 110N, MCU 210 of UAV 200 is configured to align the second L shape of charging contacts 221-223 with the first L shape of power-supply contacts 121-123; or 121, 123, and 124; or 121, 124, and 125; or 121, 125, and 122 (FIGS. 5A and 6A). Yet as another example, after UAV 200X flies above and aligns with docking portion 110X or 110N, MCU 210 of UAV 200X is configured to align the second cross shape of charging contacts 221-225 with the first cross shape of power-supply contacts 121-125 in one of the four orientations.

Step 730 includes decreasing a height of the UAV to dock with the docking portion, so that two or more of the charging contacts of the UAV are electrically coupled to two or more of the power-supply contacts of the docking portion. For example, as described above with reference to FIGS. 1-3 and 4A, after the second L shape aligns with the first L shape, MCU 210 of UAV 200 is configured to decrease the height of UAV 200 to dock with docking portion 110, so that charging contacts 221-223 of UAV 200 are electrically coupled to power-supply contacts 121-123 of docking portion 110, respectively.

Step 740 includes detecting whether two or more of the power-supply contacts on the docking portion are electrically coupled to two or more of the charging contacts of the UAV. For example, as described above with reference to FIGS. 1-3 and 4A, the control circuit (battery charging IC 130 and docking detector circuit 140) of docking station 100 is configured to detect whether power-supply contacts 121 and 122; or 121 and 123; or 121, 122, and 123 are electrically coupled to corresponding charging contacts 221 and 222; or 221 and 223; or 221, 222, and 223.

Step 750 includes supplying power to at least two of the two or more of the power-supply contacts on the docking portion in response to detecting that the two or more of the power-supply contacts are electrically coupled to the charging contacts of the UAV. For example, as described above with reference to FIGS. 1-3 and 4A, when the control circuit (battery charging IC 130 and docking detector circuit 140) of docking station 100 detects power-supply contacts 121 and 122; or 121 and 123; or 121, 122, and 123 are electrically coupled to corresponding charging contacts 221 and 222; or 221 and 223; or 221, 222, and 223, battery charging IC 130 of docking station 100 is configured to supply power to the detected power-supply contacts 121 and 122; or 121 and 123; or 121, 122, and 123 on docking portion 110.

In some embodiments, when the control circuit (battery charging IC 130 and docking detector circuit 140) of docking station 100 detects power-supply contacts 121 and 122; or 121 and 123; or 121, 122, and 123, are electrically coupled to corresponding charging contacts 221 and 222; or 221 and 223; or 221, 222, and 223, battery charging IC 130 of docking station 100 is configured to supply power to only power-supply contacts 121 and 122, or 121 and 123, as described above with reference to FIGS. 1-3 and 4A.

In some embodiments, a method for providing charging power may include a plurality of operations of docking stations and UAVs described above with reference to FIGS. 1-3, 4A-4C, 5A-5C, and/or 6A-6C.

The present disclosure is also related to features described in the following numbered embodiments ("E"). The numbered embodiments are illustrated and described according to some embodiments of the present disclosure.

E1. Docking apparatus for charging a power storage device of an external device, the docking apparatus comprising:
  a docking portion for the external device to dock with;
  a plurality of power-supply contacts mounted on a surface of the docking portion and arranged in a cross shape; and
  a control circuit configured to:
  detect whether the external device docks with the docking portion; and
  supply power to the power-supply contacts on the docking portion in response to detecting that the external device docks with the docking portion.

E2. The docking apparatus of E1, wherein the plurality of power-supply contacts on the docking portion includes five power-supply contacts arranged in the cross shape, wherein:
  a first of the five power-supply contacts is arranged at a cross point of the cross shape, and
  a remaining four of the five power-supply contacts are arranged at four ends of the cross shape.

E3. The docking apparatus of E2, wherein:
  the first power-supply contact is configured to supply a positive voltage, and
  the four power-supply contacts at the four ends are configured to supply a negative voltage.

E4. The docking apparatus of E2, wherein:
  the first power-supply contact is configured to supply a negative voltage, and
  the four power-supply contacts at the four ends are configured to supply a positive voltage.

E5. The docking apparatus of E1, wherein the control circuit is configured to detect whether the external device docks with the docking portion by
  detecting whether two or more of the power-supply contacts on the docking portion are electrically coupled to charging contacts of the external device.

E6. The docking apparatus of E5, wherein the control circuit is configured to supply power to the power-supply contacts on the docking portion in response to detecting that the external device docks with the docking portion by
supplying power to at least two of the two or more of the power-supply contacts on the docking portion in response to detecting that the two or more of the power-supply contacts are electrically coupled to the charging contacts of the external device.

E7. The docking apparatus of E6, wherein the control circuit is configured to supply power to only two of the two or more of the power-supply contacts on the docking portion in response to detecting that the two or more of the power-supply contacts are electrically coupled to the charging contacts of the external device.

E8. An unmanned aerial vehicle (UAV) system, comprising:
a UAV comprising a power storage device; and
a docking station comprising:
a docking portion for the UAV to dock with;
a plurality of power-supply contacts mounted on a surface of the docking portion and arranged in a cross shape; and
a control circuit configured to:
detect whether the UAV docks with the docking portion; and
supply power to the power-supply contacts on the docking portion in response to detecting that the UAV docks with the docking portion.

E9. The UAV system of E8, wherein the plurality of power-supply contacts on the docking portion includes five power-supply contacts arranged in the cross shape, wherein:
a first of the five power-supply contacts is arranged at a cross point of the cross shape, and
a remaining four of the five power-supply contacts are arranged at four ends of the cross shape.

E10. The UAV system of E9, wherein:
the first power-supply contact is configured to supply a positive voltage, and
the four power-supply contacts at the four ends are configured to supply a negative voltage.

E11. The UAV system of E9, wherein:
the first power-supply contact is configured to supply a negative voltage, and
the four power-supply contacts at the four ends are configured to supply a positive voltage.

E12. The UAV system of E8, wherein the control circuit is configured to detect whether the UAV docks with the docking portion by
detecting whether two or more of the power-supply contacts on the docking portion are electrically coupled to two or more of the charging contacts of the UAV.

E13. The UAV system of E12, wherein the control circuit is configured to supply power to the power-supply contacts on the docking portion in response to detecting that the UAV docks with the docking portion by
supplying power to at least two of the two or more of the power-supply contacts on the docking portion in response to detecting that the two or more of the power-supply contacts are electrically coupled to the charging contacts of the UAV.

E14. The UAV system of E13, wherein the control circuit is configured to supply power to only two of the two or more of the power-supply contacts on the docking portion in response to detecting that the two or more of the power-supply contacts are electrically coupled to the charging contacts of the UAV.

E15. The UAV system of E8, wherein:
a first of the power-supply contacts at a center of the cross shape and a second and a third of the power-supply contacts at two ends of the cross shape are arranged in a first L shape,
the plurality of charging contacts of the UAV are arranged in a second L shape, wherein dimensions of the first and second L shapes are the same; and
the UAV further comprises a controller configured to:
control the UAV to fly above and align with the docking portion, and
decrease a height of the UAV to dock with the docking portion, so that two or more of the charging contacts of the UAV are electrically coupled to two or more of the power-supply contacts of the docking portion.

E16. The UAV system of E15, wherein:
the docking portion includes four corners;
the UAV further comprises a camera configured to acquire a downward image; and
the controller is configured to control the UAV to fly above and align with the docking portion by receiving the downward image and recognizing two or more of the four corners of the docking portion based on the downward image, before decreasing the height of the UAV to dock with the docking portion.

E17. The UAV system of E15, wherein:
the UAV further comprises a camera configured to acquire a downward image, the downward image including the cross shape of the plurality of power-supply contacts on the docking portion; and
the controller is configured to control the UAV to fly above and align with the docking portion by receiving the downward image and the downward distance data and recognizing the cross shape of the plurality of power-supply contacts on the docking portion based on the downward image, before decreasing the height of the UAV to dock with the docking portion.

E18. The UAV system of E15, wherein:
the UAV further comprises:
a camera configured to acquire a downward image, and
a sensor configured to sense downward distance data; and
the controller is configured to control the UAV to fly above and align with the docking portion by receiving the downward image and the downward distance data and recognizing the plurality of power-supply contacts on the docking portion based on the downward image and the downward distance data, before decreasing the height of the UAV to dock with the docking portion.

E19. The UAV system of E8, wherein:
the cross shape, in which the plurality of power-supply contacts on the docking portion are arranged, is a first cross shape;
the plurality of charging contacts of the UAV are arranged in a second cross shape, where dimensions of the first and second cross shapes are the same; and
the UAV further comprises a controller configured to:
control the UAV to fly above and align with the docking portion, and
decrease a height of the UAV to dock with the docking portion, so that two or more of the charging contacts of the UAV are electrically coupled to two or more of the power-supply contacts of the docking portion.

E20. The UAV system of E19, wherein:
the docking portion includes four corners;
the UAV further comprises a camera configured to acquire a downward image; and the controller is configured to control the UAV to fly above and align with the docking portion by receiving the downward image and recognizing two or more of the four corners of the docking portion based on the downward image and the downward distance data, before decreasing the height of the UAV to dock with the docking portion.

E21. The UAV system of E19, wherein:
the UAV further comprises a camera configured to acquire a downward image, the downward image including the cross shape of the plurality of power-supply contacts on the docking portion; and
the controller is configured to control the UAV to fly above and align with the docking portion by receiving the downward image and recognizing the cross shape of the plurality of power-supply contacts on the docking portion based on the downward image, before decreasing the height of the UAV to dock with the docking portion.

E22. The UAV system of E19, wherein:
the UAV further comprises:
a camera configured to acquire a downward image, and
a sensor configured to sense downward distance data; and
the controller is configured to control the UAV to fly above and align with the docking portion by receiving the downward image and the downward distance data and recognizing the plurality of power-supply contacts on the docking portion based on the downward image and the downward distance data, before decreasing the height of the UAV to dock with the docking portion.

E23. The UAV system of E8, wherein:
the cross shape, in which the plurality of power-supply contacts on the docking portion are arranged, is a first cross shape;
the plurality of charging contacts of the UAV are arranged in a nine-square configuration, a first of the nine charging contacts at a center of the nine-square configuration and four of the nine charging contacts at centers of four sides of the nine-square configuration being arranged in a second cross shape, wherein dimensions of the first and second cross shapes are the same; and
the UAV further comprises a controller configured to:
control the UAV to fly above and align with the docking portion, and
decrease a height of the UAV to dock with the docking portion, so that two or more of the charging contacts of the UAV are electrically coupled to two or more of the power-supply contacts of the docking portion.

E24. The UAV system of E23, wherein:
the docking portion includes four corners;
the UAV further comprises a camera configured to acquire a downward image; and
the controller is configured to control the UAV to fly above and align with the docking portion by receiving the downward image and recognizing two or more of the four corners of the docking portion based on the downward image, before decreasing the height of the UAV to dock with the docking portion.

E25. The UAV system of E23, wherein: ht
the UAV further comprises:
a camera configured to acquire a downward image, the downward image including the cross shape of the plurality of power-supply contacts on the docking portion; and
the controller is configured to control the UAV to fly above and align with the docking portion by receiving the downward image and recognizing the cross shape of the plurality of power-supply contacts on the docking portion based on the downward image, before decreasing the height of the UAV to dock with the docking portion.

E26. The UAV system of E23, wherein:
the UAV further comprises:
a camera configured to acquire a downward image, and
a sensor configured to sense downward distance data; and
the controller is configured to control the UAV to fly above and align with the docking portion by receiving the downward image and the downward distance data and recognizing the plurality of power-supply contacts on the docking portion based on the downward image and the downward distance data, before decreasing the height of the UAV to dock with the docking portion.

E27. Docking apparatus for charging a power storage device of an external device, the docking apparatus comprising:
a docking portion for the external device to dock with;
a plurality of power-supply contacts mounted on a surface of the docking portion and arranged in a nine-square configuration; and
a control circuit configured to:
detect whether the external device docks with the docking portion; and
supply power to the power-supply contacts on the docking portion in response to detecting that the external device docks with the docking portion.

E28. The docking apparatus of E27, wherein the plurality of power-supply contacts on the docking portion includes nine power-supply contacts arranged in the nine-square configuration, wherein:
a first of the nine power-supply contacts is arranged at a center of the nine-square configuration,
a first four of the nine power-supply contacts are arranged at centers of four sides of the nine-square configuration, and
a second four of the nine power-supply contacts are arranged at four corners of the nine-square configuration.

E29. The docking apparatus of E28, wherein:
the first power-supply contact is configured to supply a positive voltage, and
the first four power-supply contacts at the centers of the four sides are configured to supply a negative voltage.

E30. The docking apparatus of E28, wherein:
the first power-supply contact is configured to supply a negative voltage, and
the first four power-supply contacts at the centers of the four sides are configured to supply a positive voltage.

E31. The docking apparatus of E27, wherein the control circuit is configured to detect whether the external device docks with the docking portion by
detecting whether two or more of the power-supply contacts on the docking portion are electrically coupled to charging contacts of the external device.

E32. The docking apparatus of E31, wherein the control circuit is configured to supply power to the power-supply contacts on the docking portion in response to detecting that the external device docks with the docking portion by
supplying power to at least two of the two or more of the power-supply contacts on the docking portion in response to detecting that the two or more of the power-supply contacts are electrically coupled to the charging contacts of the external device.

E33. The docking apparatus of E32, wherein the control circuit is configured to supply power to only two of the two or more of the power-supply contacts on the docking portion in response to detecting that the two or more of the power-supply contacts are electrically coupled to the charging contacts of the external device.

E34. An unmanned aerial vehicle (UAV) system, comprising:
a UAV comprising a power storage device; and
a docking station comprising:
a docking portion for the UAV to dock with;
a plurality of power-supply contacts mounted on a surface of the docking portion and arranged in a nine-square configuration; and
a control circuit configured to:
detect whether the UAV docks with the docking portion; and
supply power to the power-supply contacts on the docking portion in response to detecting that the UAV docks with the docking portion.

E35. The UAV system of E34, wherein the plurality of power-supply contacts on the docking portion includes nine power-supply contacts arranged in the nine-square configuration, wherein:
a first of the nine power-supply contacts is arranged at a center of the nine-square configuration,
a first four of the nine power-supply contacts are arranged at centers of four sides of the nine-square configuration, and
a second four of the nine power-supply contacts are arranged at four corners of the nine-square configuration.

E36. The UAV system of E35, wherein:
the first power-supply contact is configured to supply a positive voltage, and
the first four power-supply contacts at the centers of the four sides are configured to supply a negative voltage.

E37. The UAV system of E35, wherein:
the first power-supply contact is configured to supply a negative voltage, and
the first four power-supply contacts at the centers of the four sides are configured to supply a positive voltage.

E38. The UAV system of E34, wherein the control circuit is configured to detect whether the UAV docks with the docking portion by
detecting whether two or more of the power-supply contacts on the docking portion are electrically coupled to two or more of the charging contacts of the UAV.

E39. The UAV system of E38, wherein the control circuit is configured to supply power to the power-supply contacts on the docking portion in response to detecting that the UAV docks with the docking portion by
supplying power to at least two of the two or more of the power-supply contacts on the docking portion in response to detecting that the two or more of the power-supply contacts are electrically coupled to the charging contacts of the UAV.

E40. The UAV system of E39, wherein the control circuit is configured to supply power to only two of the two or more of the power-supply contacts on the docking portion in response to detecting that the two or more of the power-supply contacts are electrically coupled to the charging contacts of the UAV.

E41. The UAV system of E34, wherein:
a first of the power-supply contacts at a center of the nine-square configuration and a second and a third of the power-supply contacts at centers of two adjacent sides of the nine-square configuration are arranged in a first L shape;
the plurality of charging contacts of the UAV are arranged in a second L shape, wherein dimensions of the first and second L shapes are the same; and
the UAV further comprises a controller configured to:
control the UAV to fly above and align with the docking portion, and
decrease a height of the UAV to dock with the docking portion, so that the two or more of the charging contacts of the UAV are electrically coupled to the two or more of the power-supply contacts of the docking portion.

E42. The UAV system of E41, wherein:
the docking portion includes four corners;
the UAV further comprises:
a camera configured to acquire a downward image; and
the controller is configured to control the UAV to fly above and align with the docking portion by receiving the downward image and recognizing two or more of the four corners of the docking portion based on the downward image, before decreasing the height of the UAV to dock with the docking portion.

E43. The UAV system of E41, wherein:
the UAV further comprises:
a camera configured to acquire a downward image, the downward image including the nine-square configuration of the plurality of power-supply contacts on the docking portion; and
the controller is configured to control the UAV to fly above and align with the docking portion by receiving the downward image and recognizing the nine-square configuration of the plurality of power-supply contacts on the docking portion based on the downward image, before decreasing the height of the UAV to dock with the docking portion.

E44. The UAV system of E41, wherein:
the UAV further comprises:
a camera configured to acquire a downward image, and
a sensor configured to sense downward distance data; and
the controller is configured to control the UAV to fly above and align with the docking portion by receiving the downward image and the downward distance data and recognizing the plurality of power-supply contacts on the docking portion based on the downward image and the downward distance data, before decreasing the height of the UAV to dock with the docking portion.

E45. The UAV system of E34, wherein:
a first of the nine power-supply contacts at a center of the nine-square configuration and a four of the nine power-supply contacts at centers of four sides of the nine-square configuration are arranged in a first cross shape;
the plurality of charging contacts of the UAV are arranged in a second cross shape, wherein dimensions of the first and second cross shapes are the same; and
the UAV further comprises a controller configured to:
control the UAV to fly above and align with the docking portion, and
decrease a height of the UAV to dock with the docking portion, so that the two or more of the charging contacts of the UAV are electrically coupled to the two or more of the power-supply contacts of the docking portion.

E46. The UAV system of E45, wherein:
the docking portion includes four corners;
the UAV further comprises a camera configured to acquire a downward image; and the controller is configured to control the UAV to fly above and align with the docking portion by recognizing two or more of the four corners of the docking portion, by receiving the downward image and the downward distance data and recognizing two or more of the four corners of the docking portion based on the downward image and the downward distance data, before decreasing the height of the UAV to dock with the docking portion.

E47. The UAV system of E45, wherein:
the docking portion includes four corners;
the UAV further comprises:
a camera configured to acquire a downward image, the downward image including the nine-square configuration of the plurality of power-supply contacts on the docking portion; and
the controller is configured to control the UAV to fly above and align with the docking portion by receiving the downward image and recognizing the nine-square configuration of the plurality of power-supply contacts on the docking portion based on the downward image, before decreasing the height of the UAV to dock with the docking portion.

E48. The UAV system of E45, wherein:
the UAV further comprises:
a camera configured to acquire a downward image, and
a sensor configured to sense downward distance data; and
the controller is configured to control the UAV to fly above and align with the docking portion by receiving the downward image and the downward distance data and recognizing the plurality of power-supply contacts on the docking portion based on the downward image and the downward distance data, before decreasing the height of the UAV to dock with the docking portion.

E49. The UAV system of E34, wherein:
the nine-square configuration, in which the plurality of power-supply contacts on the docking portion are arranged, is a first nine-square configuration;
the plurality of charging contacts of the UAV are arranged in a second nine-square configuration, wherein dimensions of the first and second nine-square configurations are the same; and
the UAV further comprises a controller configured to:
control the UAV to fly above and align with the docking portion, and
decrease a height of the UAV to dock with the docking portion, so that the two or more of the charging contacts of the UAV are electrically coupled to the two or more of the power-supply contacts of the docking portion.

E50. The UAV system of E49, wherein:
the docking portion includes four corners;
the UAV further comprises a camera configured to acquire a downward image; and
the controller is configured to control the UAV to fly above and align with the docking portion by receiving the downward image and recognizing two or more of the four corners of the docking portion based on the downward image, before decreasing the height of the UAV to dock with the docking portion.

E51. The UAV system of E49, wherein:
the UAV further comprises a camera configured to acquire a downward image, the downward image including the nine-square configuration of the plurality of power-supply contacts on the docking portion; and
the controller is configured to control the UAV to fly above and align with the docking portion by receiving the downward image and recognizing the nine-square configuration of the plurality of power-supply contacts on the docking portion based on the downward image, before decreasing the height of the UAV to dock with the docking portion.

E52. The UAV system of E49, wherein:
the UAV further comprises:
a camera configured to acquire a downward image, and
a sensor configured to sense downward distance data; and
the controller is configured to control the UAV to fly above and align with the docking portion by receiving the downward image and the downward distance data and recognizing the plurality of power-supply contacts on the docking portion based on the downward image and the downward distance data, before decreasing the height of the UAV to dock with the docking portion.

Another aspect of the disclosure is directed to a non-transitory computer-readable medium storing instructions which, when executed, cause one or more computers to perform the methods discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be appreciated that the present disclosure is not limited to the exact construction that has been described above and illustrated in the accompanying drawings, and that various modifications and changes can be made without departing from the scope thereof. It is intended that the scope of the application should only be limited by the appended claims.

What is claimed is:

1. Docking apparatus for charging a power storage device of an external device, which includes a plurality of charging contacts arranged in a second L shape, the docking apparatus comprising:
a docking portion for the external device to dock with;
a plurality of power-supply contacts mounted on a surface of the docking portion and arranged in a first L shape; and
a control circuit configured to:
detect whether the external device docks with the docking portion; and
supply power to the power-supply contacts on the docking portion in response to detecting that the second L shape of the external device docks with the first L shape of the docking portion, wherein the external device is controlled to perform:
flying above and align with the docking portion,
determining an angle offset value of the first L shape and aligning the second L shape with the first L shape by rotating the external device relative to the docking portion according to the angle offset value, and
decreasing a height of the external device to dock with the docking portion, so that the two or more of the charging contacts of the external device are electrically coupled to the two or more of the power-supply contacts of the docking portion.

2. The docking apparatus of claim 1, wherein the plurality of power-supply contacts on the docking portion includes three power-supply contacts arranged in the first L shape, wherein:

a first of the three power-supply contacts is arranged at a corner of the first L shape, and a second and a third of the three power-supply contacts are arranged at two ends of the first L shape.

3. The docking apparatus of claim 2, wherein:
the first power-supply contact is configured to supply a positive voltage, and
the second and third power-supply contacts are configured to supply a negative voltage.

4. The docking apparatus of claim 2, wherein:
the first power-supply contact is configured to supply a negative voltage, and
the second and third power-supply contacts are configured to supply a positive voltage.

5. The docking apparatus of claim 1, wherein the control circuit is configured to detect whether the external device docks with the docking portion by
detecting whether two or more of the power-supply contacts on the docking portion are electrically coupled to charging contacts of the external device.

6. The docking apparatus of claim 5, wherein the control circuit is configured to supply power to the power-supply contacts on the docking portion in response to detecting that the external device docks with the docking portion by
supplying power to at least two of the two or more of the power-supply contacts on the docking portion in response to detecting that the two or more of the power-supply contacts are electrically coupled to the charging contacts of the external device.

7. The docking apparatus of claim 6, wherein the control circuit is configured to supply power to only two of the two or more of the power-supply contacts on the docking portion in response to detecting that the two or more of the power-supply contacts are electrically coupled to the charging contacts of the external device.

8. An unmanned aerial vehicle (UAV) system, comprising:
a UAV comprising a power storage device and a plurality of charging contacts; and
a docking station comprising:
a docking portion for the UAV to dock with;
a plurality of power-supply contacts mounted on a surface of the docking portion and arranged in an L shape; and
a control circuit configured to:
detect whether the UAV docks with the docking portion; and
supply power to the power-supply contacts on the docking portion in response to detecting that the UAV docks with the docking portion;
wherein:
the L shape, in which the plurality of power-supply contacts on the docking portion are arranged, is a first L shape;
the plurality of charging contacts of the UAV are arranged in a second L shape, wherein dimensions of the first and second L shapes are the same; and
the UAV further comprises a controller configured to:
control the UAV to fly above and align with the docking portion,
determine an angle offset value of the first L shape;
align the second L shape with the first L shape by rotating the UAV relative to the docking portion according to the angle offset value, and
decrease a height of the UAV to dock with the docking portion, so that the two or more of the charging contacts of the UAV are electrically coupled to the two or more of the power-supply contacts of the docking portion.

9. The UAV system of claim 8, wherein the plurality of power-supply contacts on the docking portion include three power-supply contacts arranged in the L shape, wherein:
a first of the three power-supply contacts is arranged at a corner of the L shape, and
a second and a third of the three power-supply contacts are arranged at two ends of the L shape.

10. The UAV system of claim 9, wherein:
the first power-supply contact is configured to supply a positive voltage, and
the second and third power-supply contacts are configured to supply a negative voltage.

11. The UAV system of claim 9, wherein:
the first power-supply contact is configured to supply a negative voltage, and
the second and third power-supply contacts are configured to supply a positive voltage.

12. The UAV system of claim 8, wherein the control circuit is configured to detect whether the UAV docks with the docking portion by
detecting whether two or more of the power-supply contacts on the docking portion are electrically coupled to two or more of the charging contacts of the UAV.

13. The UAV system of claim 12, wherein the control circuit is configured to supply power to the power-supply contacts on the docking portion in response to detecting that the UAV docks with the docking portion by
supplying power to at least two of the two or more of the power-supply contacts on the docking portion in response to detecting that the two or more of the power-supply contacts are electrically coupled to the charging contacts of the UAV.

14. The UAV system of claim 13, wherein the control circuit is configured to supply power to only two of the two or more of the power-supply contacts on the docking portion in response to detecting that the two or more of the power-supply contacts are electrically coupled to the charging contacts of the UAV.

15. The UAV system of claim 8, wherein:
the docking portion includes four corners;
the UAV further comprises a camera configured to acquire a downward image; and
the controller is configured to control the UAV to fly above and align with the docking portion, by receiving the downward image and recognizing two or more of the four corners of the docking portion based on the downward image, before decreasing the height of the UAV to dock with the docking portion.

16. The UAV system of claim 8, wherein:
the UAV further comprises a camera configured to acquire a downward image, the downward image including the first L shape of the plurality of power-supply contacts on the docking portion; and
the controller is configured to control the UAV to fly above and align with the docking portion, by receiving the downward image and recognizing the first L shape of the plurality of power-supply contacts on the docking portion based on the downward image, before decreasing the height of the UAV to dock with the docking portion.

17. The UAV system of claim 8, wherein:
the UAV further comprises:
a camera configured to acquire a downward image, and
a sensor configured to sense downward distance data; and the controller is configured to control the UAV to fly above and align with the docking portion, by receiving the downward image and the downward distance data and recognizing the plurality of power-supply contacts on the docking portion based on the downward image and the downward distance data, before decreasing the height of the UAV to dock with the docking portion.

18. The UAV system of claim 8, wherein the controller is configured to align the second L shape with the first L shape by rotating the UAV 90, 180, or 270 degrees relative to the docking portion.

19. The UAV system of claim 8, wherein:
the L shape, in which the plurality of power-supply contacts on the docking portion are arranged, is a first L shape;
the plurality of charging contacts of the UAV are arranged in a cross shape, a first of the charging contacts at a center of the cross shape and a second and a third of the charging contacts at two ends of the cross shape forming a second L shape, wherein dimensions of the first and second L shapes are the same; and
the UAV further comprising a controller configured to:
control the UAV to fly above and align with the docking portion, and
decrease a height of the UAV to dock with the docking portion.

20. The UAV system of claim 19, wherein:
the docking portion includes four corners;
the UAV further comprises a camera configured to acquire a downward image; and
the controller is configured to control the UAV to fly above and align with the docking portion, by receiving the downward image and recognizing two or more of the four corners of the docking portion based on the downward image, before decreasing the height of the UAV to dock with the docking portion.

21. The UAV system of claim 19, wherein:
the UAV further comprises a camera configured to acquire a downward image, the downward image including the first L shape of the plurality of power-supply contacts on the docking portion; and
the controller is configured to control the UAV to fly above and align with the docking portion, by receiving the downward image and recognizing the first L shape of the plurality of power-supply contacts on the docking portion based on the downward image, before decreasing the height of the UAV to dock with the docking portion.

22. The UAV system of claim 19, wherein:
the UAV further comprises:
a camera configured to acquire a downward image, and
a sensor configured to sense downward distance data; and
the controller is configured to control the UAV to fly above and align with the docking portion, by receiving the downward image and the downward distance data and recognizing the plurality of power-supply contacts on the docking portion based on the downward image and the downward distance data, before decreasing the height of the UAV to dock with the docking portion.

23. The UAV system of claim 8, wherein:
the L shape, in which the plurality of power-supply contacts on the docking portion are arranged, is a first L shape;
the plurality of charging contacts of the UAV are arranged in a nine-square configuration, a first of the charging contacts at a center of the nine-square configuration and a second and a third of the charging contacts at centers of two adjacent sides of the nine-square configuration forming a second L shape, wherein dimensions of the first and second L shapes are the same; and
the UAV further comprises a controller configured to:
control the UAV to fly above and align with the docking portion to, and
decrease a height of the UAV to dock with the docking portion.

24. The UAV system of claim 23, wherein:
the docking portion includes four corners;
the UAV further comprises a camera configured to acquire a downward image; and
the controller is configured to control the UAV to fly above and align with the docking portion, by receiving the downward image and recognizing two or more of the four corners of the docking portion based on the downward image, before decreasing the height of the UAV to dock with the docking portion.

25. The UAV system of claim 23, wherein:
the UAV further comprises a camera configured to acquire a downward image, the downward image including the first L shape of the plurality of power-supply contacts on the docking portion; and
the controller is configured to control the UAV to fly above and align with the docking portion, by receiving the downward image and recognizing the first L shape of the plurality of power-supply contacts on the docking portion based on the downward image, before decreasing the height of the UAV to dock with the docking portion.

26. The UAV system of claim 23, wherein:
the UAV further comprises:
a camera configured to acquire a downward image, and
a sensor configured to sense downward distance data; and
the controller is configured to control the UAV to fly above and align with the docking portion, by receiving the downward image and the downward distance data and recognizing the plurality of power-supply contacts on the docking portion based on the downward image and the downward distance data, before decreasing the height of the UAV to dock with the docking portion.

27. A method for providing charging power to an unmanned aerial vehicle (UAV), the method comprising:
controlling the UAV to fly above and align with a docking portion of docking apparatus,
aligning a plurality of charging contacts of the UAV with a plurality of power-supply contacts on the docking portion, and
decreasing a height of the UAV to dock with the docking portion, so that two or more of the charging contacts of the UAV are electrically coupled to two or more of the power-supply contacts of the docking portion;
wherein:
the plurality of power-supply contacts on the docking portion are arranged in a first L shape;
the plurality of charging contacts of the UAV are arranged in a second L shape, wherein dimensions of the first and second L shapes are the same;
determine an angle offset value of the first L shape;
rotating the UAV relative to the docking portion according to the angle offset value; and
aligning the plurality of charging contacts of the UAV with the plurality of power-supply contacts on the docking portion includes aligning the second L shape with the first L shape.

28. The method of claim 27, wherein the docking portion includes four corners, the UAV comprising a camera configured to acquire a downward image, wherein controlling the UAV to fly above and align with the docking portion includes:
  receiving the downward image; and
  recognizing two or more of the four corners of the docking portion based on the downward image.

29. The method of claim 27, wherein the UAV comprising a camera configured to acquire a downward image, the downward image including the first L shape of the plurality of power-supply contacts on the docking portion, wherein controlling the UAV to fly above and align with the docking portion includes:
  receiving the downward image; and
  recognizing the first L shape of the plurality of power-supply contacts on the docking portion based on the downward image.

30. The method of claim 27, wherein the docking portion includes four corners, the UAV comprising a camera configured to acquire a downward image and a sensor configured to sense downward distance data, wherein controlling the UAV to fly above and align with the docking portion includes:
  receiving the downward image and the downward distance data; and
  recognizing the plurality of power-supply contacts on the docking portion based on the downward image and the downward distance data.

31. The method of claim 27, wherein aligning the second L shape with the first L shape includes rotating the UAV 90, 180, or 270 degrees relative to the docking portion.

32. The method of claim 27, further comprising:
  detecting whether two or more of the power-supply contacts on the docking portion are electrically coupled to two or more of the charging contacts of the UAV; and
  supplying power to at least two of the two or more of the power-supply contacts on the docking portion in response to detecting that the two or more of the power-supply contacts are electrically coupled to the charging contacts of the UAV.

33. The method of claim 32, wherein supplying power to at least two of the two or more of the power-supply contacts on the docking portion includes
  supplying power to only two of the two or more of the power-supply contacts on the docking portion.

* * * * *